(12) United States Patent
Nonaka

(10) Patent No.: US 6,771,899 B2
(45) Date of Patent: Aug. 3, 2004

(54) CAMERA AND CONTROL METHOD FOR FOCUSING DEVICE

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/616,730

(22) Filed: Jul. 10, 2003

(65) Prior Publication Data

US 2004/0028401 A1 Feb. 12, 2004

(30) Foreign Application Priority Data

Jul. 16, 2002 (JP) ........................................ 2002-207463

(51) Int. Cl.[7] .............................................. G03B 13/36
(52) U.S. Cl. ........................ 396/121; 396/137; 396/147
(58) Field of Search ................................ 396/121–123, 396/131, 137, 147

(56) References Cited

U.S. PATENT DOCUMENTS 5,950,022 A * 9/1999 Hagiwara .................... 396/121
6,118,943 A    9/2000 Ohsawa \* cited by examiner

*Primary Examiner*—W. B. Perkey
(74) *Attorney, Agent, or Firm*—Straub & Pokotylo; John C. Pokotylo

(57) ABSTRACT

In a camera of this invention, the first candidate point of a plurality of points in a frame is determined by a first release switch, and the second candidate point of the plurality of points which is different from the first candidate point is selected by a second release switch. The operation of a predetermined switch by a photographer is detected by a switch. A BCPU selects/switches the first or second candidate point in accordance with the state detected by the switch.

27 Claims, 5 Drawing Sheets

CAMERA AND CONTROL METHOD FOR FOCUSING DEVICE

CROSS-REFERENCE TO RELATED APPLICATIONS

This application is based upon and claims the benefit of priority from the prior Japanese Patent Application No. 2002-207463, filed Jul. 16, 2002, the entire contents of which are incorporated herein by reference.

BACKGROUND OF THE INVENTION

1. Field of the Invention

The present invention relates to an improvement in auto-focus (AF) technique for a camera and, more particularly, to an improvement in so-called multi-point (multi) AF technique which has a plurality of distance measurement points within a frame.

2. Description of the Related Art

In general, if a camera has a plurality of distance measurement points in a frame as well as the one in the center of the frame, focus adjustment can be done regardless of the position of a main object to be photographed within the frame. On the other hand, the camera may be focused on an object which is not intended by the photographer.

In order to prevent the above erroneous focus adjustment, for example, U.S. Pat. No. 6,118,943 discloses a technique of selecting a distance measurement point with a manual switch. Recently, an increasing number of photographers enjoy photographing operation with finer focus position control. In more instances, photographers take photographs while performing focus adjustment in the manual mode, e.g., focusing the camera in consideration of the balance of a plurality of objects to be photographed or intentionally defocusing the camera instead of simple automatic focus adjustment for one point.

Many cameras having such an arrangement include special operation members for manual operation. By effectively using such operation members, a high value-added product can be provided which can reduce complexity in operation and suppress an increase in cost.

BRIEF SUMMARY OF THE INVENTION

It is, therefore, an object of the present invention to provide a camera and a control method for a focusing device which can quickly cancel focus adjustment for an unintended object to be photographed, which tends to occur in multi AF operation, and perform focus control for an object intended by a photographer at high speed.

According to the first feature of the present invention, there is provided a camera having an auto-focus section having distance measurement points corresponding to a plurality of points in a frame,
   the auto-focus section including a first determining section which determines a first candidate point of the plurality of points, and a second determining section which determines a second candidate point of the plurality of points which is different from the first candidate point,
   the camera comprising:
      a switch detecting section which detects operation of a predetermined switch by a photographer; and
      a selecting section which selects/switches the first and second candidate points in accordance with a state detected by the switch detecting section.

According to the second feature of the present invention, there is provided a multi-point auto-focus camera having a selection/display control section which selects and displays at least one of a plurality of distance measurement points using a predetermined algorithm, comprising:
   a switch which selects a manual focus mode; and
   a point switching control section which switches the selected/displayed point in accordance with operation of the switch when control operation is performed by the selection/display control section.

According to the third feature of the present invention, there is provided a camera comprising:
   an operating section which issues an instruction associated with focusing operation;
   an auto-focus section which performs focusing operation on the basis of an in-focus point position in a frame;
   a switching section which switches the in-focus point position in the frame; and
   a control section which performs control to set an instruction from the operating section as a switching instruction to the switching section or a specific operation instruction associated with focusing operation other than the switching operation.

According to the fourth feature of the present invention, there is provided a control method for a focusing device which can switch in-focus point positions for auto-focus operation within a frame,
   wherein an operation instruction by a specific operation section which issues an instruction associated with focusing operation is controlled as an instruction to switch the in-focus position within a predetermined period after the start of auto-focus operation, and as a specific instruction associated with another focusing operation other than the in-focus point position switching during a period other than the predetermined period.

Advantages of the present invention will be set forth in the description which follows, and in part will be obvious from the description, or may be learned by practice of the present invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIGS. 1A and 1B show the arrangement of a camera according to the first embodiment of the present invention, in which FIG. 1A is a block diagram showing the internal arrangement of the camera, and FIG. 1B is a perspective view showing the outer appearance of the camera;

DETAILED DESCRIPTION OF THE INVENTION

The embodiments of the present invention will be described below with reference to the several views of the accompanying drawing.

Figure 1A:
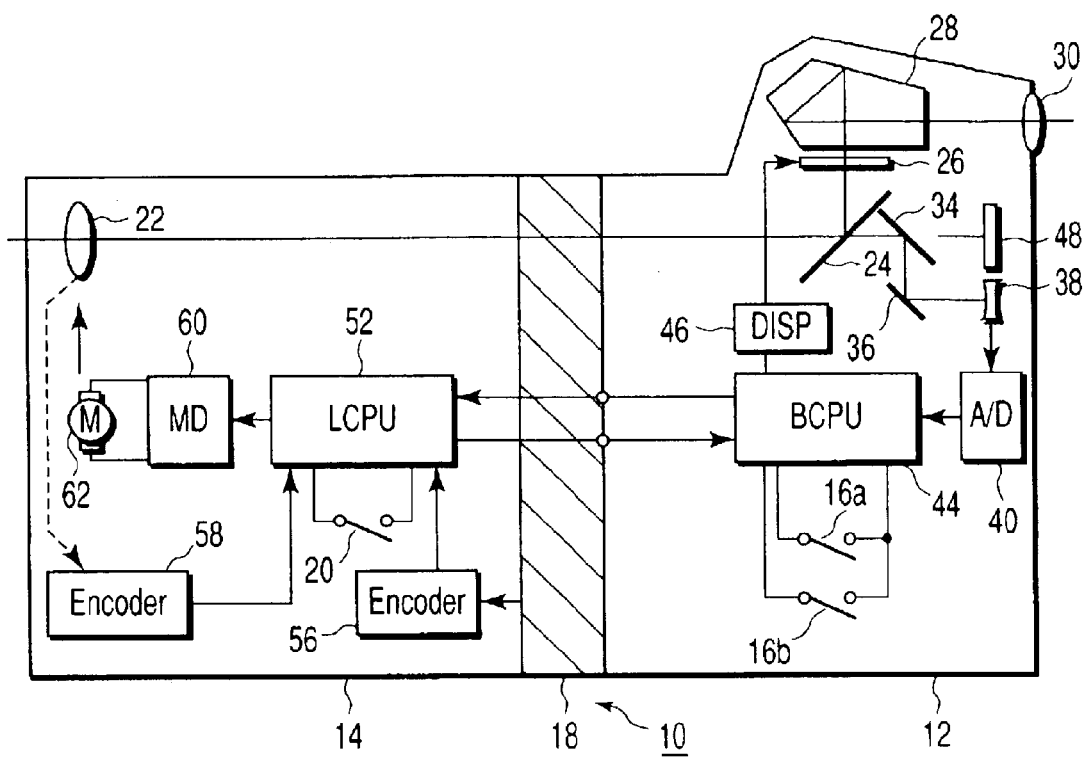
Figure 1B:
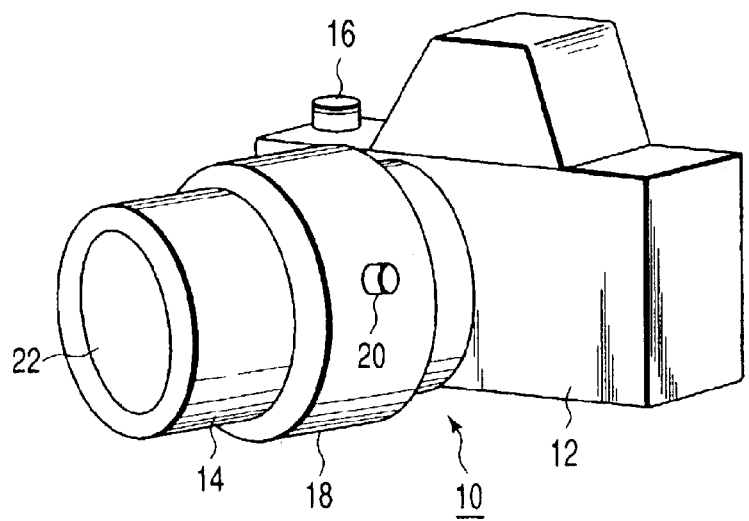

FIGS. 1A and 1B show the arrangement of a camera according to the first embodiment of the present invention. FIG. 1A is a block diagram of the internal arrangement of the camera. FIG. 1B is a perspective view showing the outer appearance of the camera.

A camera 10 of this embodiment is comprised of a camera body 12 and lens barrel portion 14. The camera body 12 includes a release switch 16. A focusing rotating ring 18 for focusing operation is rotatably mounted on the lens barrel portion 14.

The focusing rotating ring 18 includes a switch 20. The switch 20 switches between the AF (Auto-Focus) mode, which is usually set, and the MF (Manual Focus) mode. As will be described later, the switch 20 switches candidate points in the AF mode.

A photographing light beam incident through a focusing lens 22 in the lens barrel portion 14 is reflected by a main mirror (quick return mirror) 24 in the camera body 12, and then formed into an image on a focusing screen 26. The light beam passing through the focusing screen 26 is guided to an eye of a photographer through a pentagonal prism 28 and an eyepiece 30 of a finder.

The main mirror 24 is formed from a half mirror that can transmit part of the light. Part of the photographing light beam guided by the lens barrel portion 14 is transmitted through the main mirror 24 and guided to an AF sensor 38 through two mirrors 34 and 36. The photographing light beam guided to the AF sensor 38 is photoelectrically converted into an image signal. This signal is converted into a digital signal by an A/D converter 40. The resultant signal is then supplied to a body arithmetic control circuit (BCPU) 44.

The BCPU 44 is comprised of a one-chip microcomputer and the like. The BCPU 44 is designed to perform focus control while communicating with a lens arithmetic control circuit (LCPU) 52 in the lens barrel portion 14. A display control section (DISP) 46, a first release switch 16a, a second release switch 16b, and the LCPU 52 are connected to the BCPU 44.

The DISP 46 causes an LCD or LED to display an in-focus mark on the focusing screen 26. The first release switch 16a and second release switch 16b correspond to the release switch 16.

At the time of photographing operation, the main mirror 24 and the like are retracted from the optical path, and the photographing light beam guided through the focusing lens 22 is guided to and formed into an image on an image sensing element 26 such as an area sensor placed behind (on the right side in FIG. 1A) the main mirror 24. The main mirror 24 and the like are retracted from the optical path by a mechanism (not shown) when the second release switch 16b is turned on.

The switch 20, encoders 56 and 58, and a motor driver (MD) 60 for driving a lens driving motor 62 are connected to the LCPU 52. The encoder 56 detects the movement of the focusing rotating ring 18. The encoder 58 detects the movement of the focusing lens 22.

In the camera having the above arrangement, when the release switch 16 of the camera body 12 is operated, a focus position is determined by the encoder 58, motor driver 60, an motor 62 which constitute a focus detecting section in the main body. The focusing lens 22 in the lens barrel portion 14 is then controlled in accordance with the above operation to implement an auto-focus function.

In this case, if the user wants to manually focus the camera, he/she presses the switch 20. With this operation, the AF function is canceled, and the direction and rotation amount of the focusing rotating ring 18 are detected as the user operates it. This makes it possible to control the focusing lens 22.

That is, in the camera body 12, an image signal obtained through the focusing lens 22 is guided to the AF sensor 38 by an optical system constituted by the main mirror 24, the two mirrors 34 and 36, and the like. An output from the AF sensor 38 is converted into a digital signal by the A/D converter 40. The BCPU 44 then uses this signal to calculate the in-focus position of the focusing lens 22, and notifies the LCPU 52 of the result.

The LCPU 52 controls the lens driving motor 62 through the motor driver 60 while correcting the part errors of the lens and the like. When the focusing lens 22 moves, the movement is detected by the encoder 58. The position of the focusing lens 22 is then feedback-controlled by the LCPU 52.

When the switch 20 is operated, the LCPU 52 detects this. As described above, the LCPU 52 detects the movement of the operated focusing rotating ring 18 through the encoder 56, regardless of an AF signal from the BCPU 44, and controls the focusing lens 22 in accordance with this detection. At this time, the photographer performs focus adjustment while looking into the finder eyepiece 30 and looking at an object image formed on the focusing screen 26 by the main mirror 24 through the pentagonal prism 28.

Figure 2A:
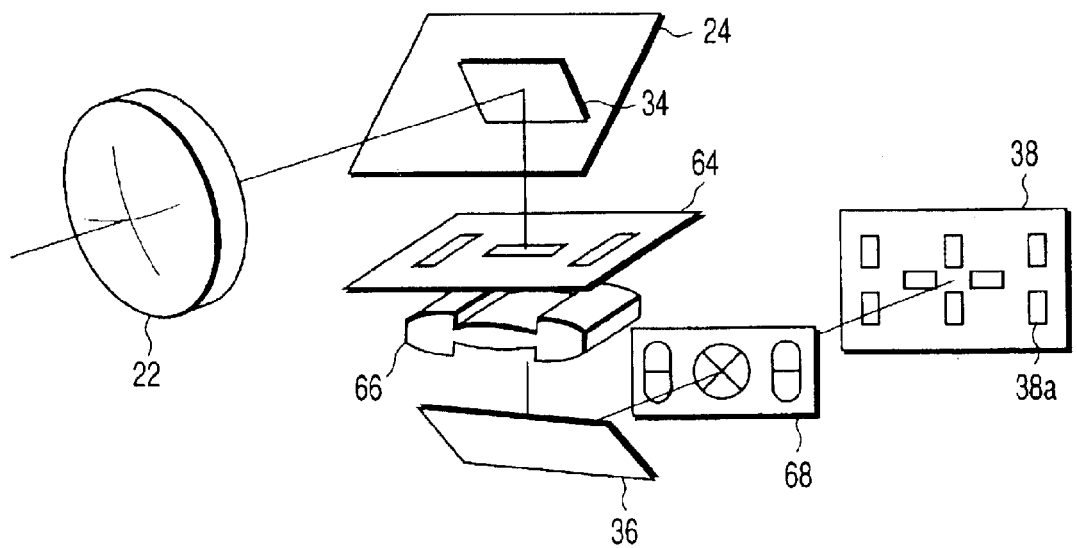
FIG. 2A is a view showing an example of the arrangement of an auto-focus (AF) optical system.

The optical system for the auto-focus (AF) mode has an arrangement like the one shown in FIG. 2A.

Part of light passing through the focusing lens 22 is guided to a field mask 64 through the main mirror 24, which serves as a half mirror to transmit image light, and the sub-mirror 34. The field mask 64 is designed to determine a focus position within a frame. In this manner, light at a predetermined point within the frame is guided to a re-imaging lens 68 through a condenser lens 66 and the return mirror 36.

The re-imaging lens 68 forms a pair of object images with a predetermined parallax on a light-receiving surface 38a of the AF sensor 38. When the positional relationship between the pair of object images is set to a predetermined relationship, the focusing lens 22 is set in an in-focus state. The BCPU 44 therefore checks the degree of coincidence between the pair of object images to detect the position difference.

Figure 2B:
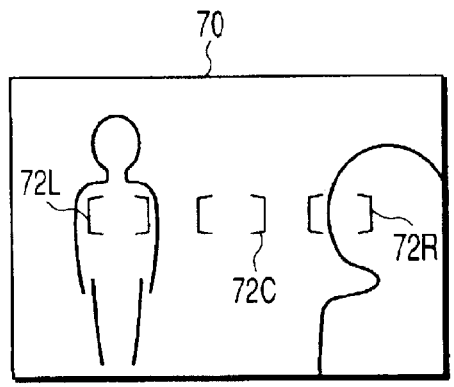
FIG. 2B is a view showing a display example of the measurement frames for three points in a frame 70 on which the camera can be focused.
Figure 2C:
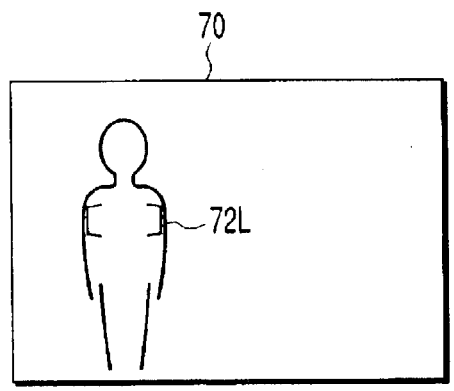
FIG. 2C is a view showing a display example of the measurement frame of a point of the three points in FIG. 2B on which the camera is focused.

As is obvious from the arrangement in which the sensor is provided in correspondence with light split from the field mask 64, focus adjustment can be performed at three points 72L, 72C, and 72R in a frame 70, as shown in FIG. 2B. When the camera is to be focused on the point 72L, only a measurement frame at this position is displayed by the above display control as shown in FIG. 2C so as to allow the photographer to quickly determine on which point the camera is focused.

The photographing operation of the camera having the above arrangement will be described next. The flow chart for this operation is controlled by the BCPU 44 and also includes a portion directly controlled by the LCPU 52, in particular.

The camera 10 has the first release switch 16a and second release switch 16b. The first release switch 16a is turned on when the release button is pressed half way. The second release switch 16b is turned on when the release button is pressed fully. The arrangement of the camera 10 is based on the premise that auto-focus operation is performed when the first release switch 16a is turned on. The photographer checks the operation result in the finder, and fully presses the release button to perform photographing operation if he/she determines that the result is acceptable.

When the first release switch 16a is turned on, a focus position is detected by the AF sensor 38, and focusing lens drive control is performed. The photographer can therefore check within the finder whether or not the camera is properly focused properly. In addition, the photographer can immediately determine by the above display control on which point the camera is focused.

Various methods have been conventionally studied with regard to which one of the three points (72L, 72C, and 72R) priority should be given. A method of focusing the camera on an object nearest thereto is generally used.

Figure 3:
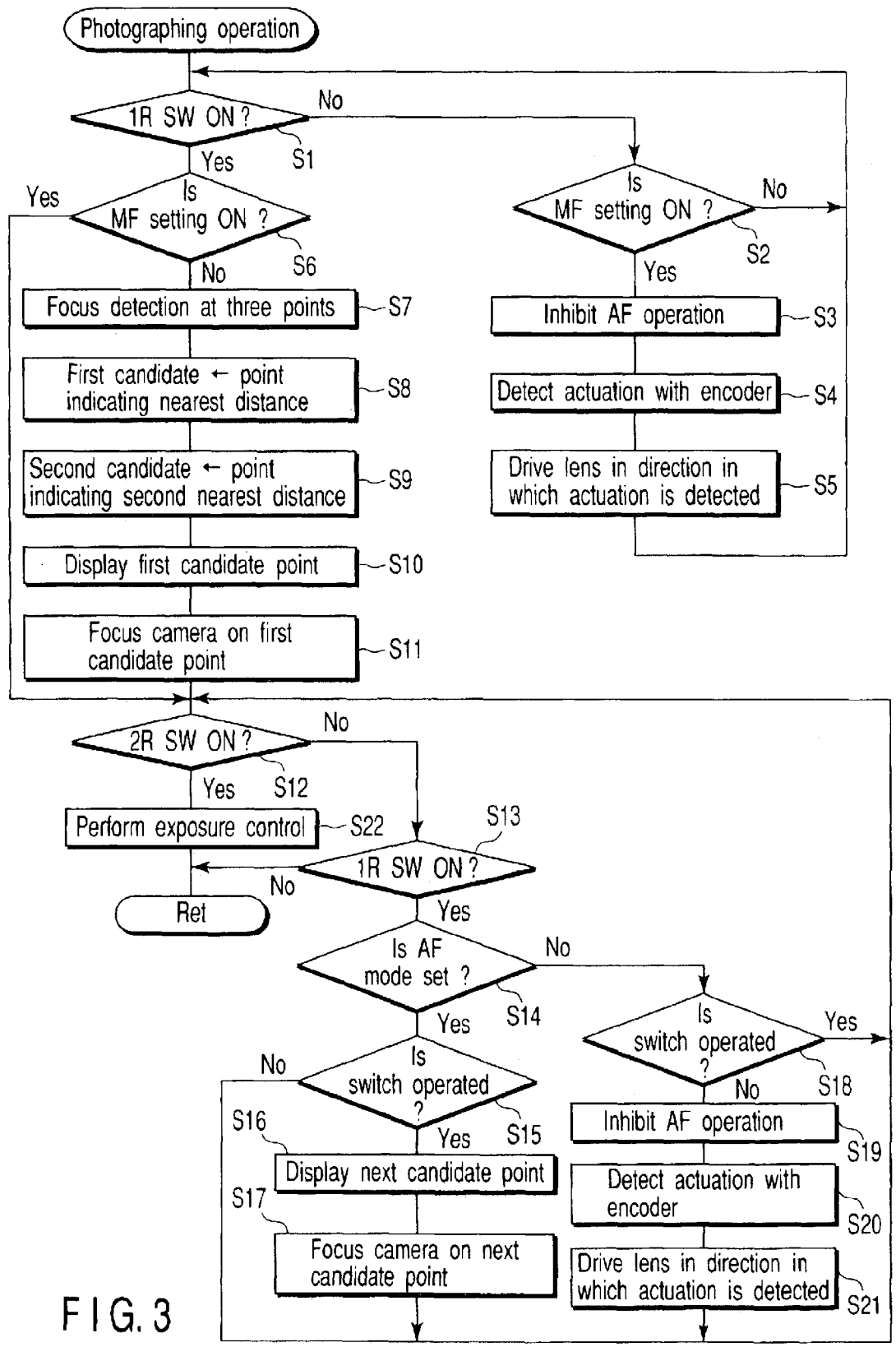
FIG. 3 is a flow chart for explaining the photographing operation of the camera according to the first embodiment of the present invention.

In this method, however, for example, in the composition shown in FIG. 2B, when a person showing his/her back enters at the point 72R, the camera is not focused on the main object at the point 72L. The flow chart shown in FIG. 3 shows operation of quickly focusing the camera on the person at the point 72L in consideration of such a situation. In a word, an object second nearest to the camera is selected as the second candidate in advance, and when the switch 20 is operated, the second candidate is selected.

The photographing operation of the camera according to the first embodiment will be described below with reference to the flow chart of FIG. 3.

In step S1, the state of the first release switch (1RSW) 16a is checked. If the first release switch 16a is not ON, the flow advances to step S2. If the switch is ON, the flow advances to step S6. In either case, the state of the manual focus mode (MF mode) is checked. The ON/OFF state of this manual focus mode is detected from the state of the switch 20 mounted on the focusing rotating ring 18.

If it is determined in step S2 that the manual focus mode is ON, operation in the manual focus mode in steps S3 to S5 is executed. As described above, in the manual focus mode, the photographer performs focusing operation by rotating the focusing rotating ring 18 mounted on the lens barrel portion 14. When the switch 20 is pressed, the LCPU 52 detects this (the ON state of the switch), and communicates with the BCPU 44 so as to inhibit auto-focus operation in step S3.

In step S4, the actuation of the focusing rotating ring 18 is detected by the encoder 56. In step S5, focus control based on the detected operation is performed. Thereafter, the flow returns to step S1.

If it is determined in step S2 that the manual focus setting is not ON, the flow returns to step S1.

If it is determined in step S6 that the manual focus setting is ON, the flow advances to step S12. If the manual focus setting is not ON, the auto-focus mode is set, and the flow advances to step S7.

In step S7, focus detection is performed at three points. This focus detection makes it possible to grasp the positional relationship among objects at the three points. In subsequent steps S8 and S9, the nearest point is ranked as the first candidate, and the second nearest point is ranked as the second candidate. In steps S10 and S11, the point corresponding to the first candidate is displayed on the focusing screen 26, and focus adjustment is performed.

Assume that the focus is to be shifted from the object at the point 72R to the object at the point 72L in the frame shown in FIG. 2B. In this case, according to a conventional camera, there is no other choice but to switch the auto-focus mode to the manual focus mode. In this embodiment, however, in the scene shown in FIG. 2B, the points 72R and 72L are set as the first and second candidates, respectively, and the frame indicator of the point 72R is turned on. The object at the point 72R is brought into focus so that the user can clearly see it in the finder. If the user looks at this object and thinks that proper focus is attained, he/she may further presses the release button to start photographing operation.

If it is determined in step S12 that the second release switch 16b is ON, the flow advances to step S22 to perform exposure control with the camera being focused on the first candidate.

If it is determined in step S12 that the second release switch 16b is not ON, the flow advances to step S13 to detect the state of the first release switch 16a. If the first release switch 16a is not ON, this routine is terminated. If this switch is ON, the flow advances to step S14.

In step S14, it is checked whether or not the auto-focus mode is set. If it is determined that the auto-focus mode is set, the flow advances to step S15. If it is determined that the auto-focus mode is not set, the flow advances to step S18.

If the auto-focus mode is set, it is checked in step S15 whether or not the switch 20 is operated. In this case, the switch 20 functions as a point switching instruction. That is, when the switch 20 is operated, the flow advances to step S16 to display the next candidate point on the focusing screen 26. In step S17, the camera is focused on the next candidate point. The flow then advances to step S12.

If it is determined in step S15 that the switch 20 is not operated, the flow skips steps S16 and S17 and advances to step S12.

If the auto-focus mode is not set, i.e., the manual focus mode is set, it is checked in step S18 whether or not the switch 20 is operated. In this case, the switch 20 functions as an instruction to switch from the manual focus mode to the auto-focus mode. This is because, after the first release switch 16a is turned on, when the switch 20 is operated, it functions to switch to the auto-focus mode regardless whether the manual focus mode is set.

If the manual focus setting is kept on, the flow advances to step S19 to inhibit auto-focus operation. In step S20, the actuation of the focusing rotating ring 18 is detected by the encoder 56. In step S21, focus control based on the detected operation is performed. The flow then shifts to step S12. In this manner, as in steps S3 to S5, lens control is performed on the basis of the focusing rotating ring 18 operated by the photographer.

If it is determined that the manual focus setting is turned off, the auto-focus mode is set, and the flow shifts to step S12.

According to the first embodiment, since a desired object tends to exist in association with the object distance order, a desired point position can be efficiently searched out with a small number of times of switching.

As described above, according to the first embodiment, when the photographer wants to reflect his/her will in auto-focus control, he/she can change an in-focus point or focus control by operating the same switch (switch 20). In displaying an in-focus point in the AF mode, the photographer changes the in-focus point. In the MF mode before AF operation, he/she allows focus control by the focusing rotating ring. This makes it possible to quickly perform optimal focus adjustment switching in accordance with situations.

This embodiment has been described on the assumption that three-point multi AF operation is performed. However, as the number of AF points increases, the effect of the present invention becomes more noticeable.

The second embodiment of the present invention will be described next.

Figure 4:
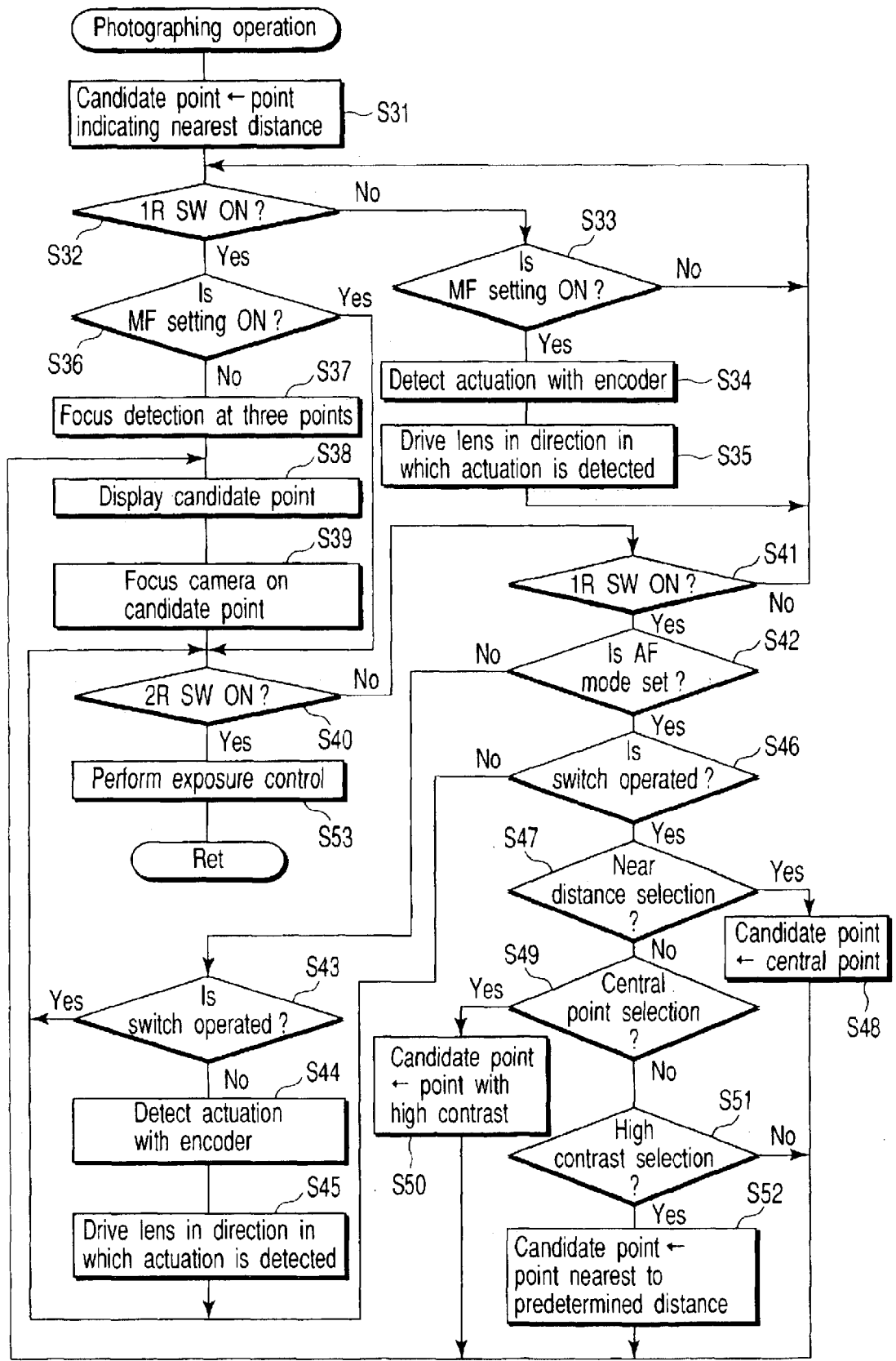
FIG. 4 is a flow chart for explaining the photographing operation of the camera according to the second embodiment of the present invention.

FIG. 4 is a flow chart for explaining the photographing operation of a camera according to the second embodiment.

The second embodiment is a combination of the scheme of selecting a point at the nearest distance from the camera as in the first embodiment, a scheme of giving priority to a point in the center of a frame, a scheme of giving priority to a point with high contrast, a scheme of selecting a point nearest to a predetermined distance, and the like. This makes it possible to provide a camera with a multi AF function which can properly cope with a larger number of various scenes.

The second embodiment differs from the first embodiment in operation, but the cameras in these embodiments have the same arrangement. The same reference numerals as in the first embodiment denote the same parts in the second embodiment, and an illustration thereof and a description of their operations will be omitted, and only different operations will be described.

In step S31, the scheme of giving priority to the nearest distance is set as a candidate point selection scheme. In step S32, the state of a first release switch 16a is detected. If the first release switch 16a is ON, the flow advances to step S36. If this switch is not ON, the flow advances to step S33.

If it is determined in step S33 that the manual focus setting is ON, the flow advances to step S34. In step S34, the actuation of a focusing rotating ring 18 is detected by an encoder 56. In step S35, focus control based on the detected operation is performed. The flow then shifts to step S32.

If it is determined in step S33 that the manual focus setting is not ON, the flow shifts to step S32.

If it is determined in step S36 that the manual focus setting is ON, the flow advances to step S40. Otherwise, the auto-focus mode is set, and the flow shifts to step S37.

In step S37, three-point focus detection is performed as in the first embodiment. In step S38, the detected point is displayed. In step S39, the camera is focused on the point. If it is determined in step S40 that a second release switch 16b is ON, the flow advances to step S53 to directly perform exposure control, thereby terminating the photographing operation.

If it is determined in step S40 that the second release switch 16b is not ON, the flow advances to step S41 to detect the first release switch 16a. If the first release switch 16a is also OFF, the flow shifts to step S32. If the first release switch 16a is ON, the flow advances to step S42 to check whether or not the auto-focus mode is set.

If it is determined in step S42 that the auto-focus mode is not set, the flow advances to step S43. In contrast to this, if it is determined in step S42 that the auto-focus mode is set, the flow advances to step S46.

If the auto-focus mode is not set, i.e., the manual focus mode is set, it is checked in step S43 whether or not a switch 20 is operated. In this case, as in the first embodiment, the switch 20 functions as an instruction to switch from the manual focus mode to the auto-focus mode.

If the manual focus setting is maintained, the actuation of the focusing rotating ring 18 is detected by the encoder 56 in step S44. In step S45, focus control based on the detected operation is performed. Thereafter, the flow shifts to step S40.

If it is determined in step S43 that the manual focus setting is turned off by operating the switch 20, the flow shifts to step S40.

If it is determined in step S42 that the auto-focus mode is set, the flow advances to step S46. It is then checked in step S46 whether or not the switch 20 is operated. If it is determined that the switch 20 is not operated, the flow shifts to step S40.

If the result obtained by performing focus adjustment in accordance with the operation of the first release switch 16a in the auto-focus mode differs from the photographer's intension, the photographer may operate the switch 20. At this time, priority methods for auto-focus points are switched in operation from step S47.

More specifically, it is determined that the photographer cannot photograph an object at a desired focus point by selecting the method of giving priority to an object at the nearest distance which is set in step S31. With this determination, the switch 20 is operated to change the selection scheme before the auto-focus operation is switched to the manual focus operation. As a consequence, the flow advances from step S47 to step S48 to switch from the scheme of giving priority to an object at the nearest distance to the scheme of selecting a distance measurement point with priority being given to a measurement point in the center.

With this operation, the current mode is switched to the distance measurement mode in which a point in the center of a frame is set as a candidate point. As described above, a new candidate point is then displayed, and focus adjustment is performed in steps S38 and S39.

When the switch 20 is operated in spite of the fact that a point in the center of a frame has been selected, the user is dissatisfied with this scheme. The flow therefore advances from step S49 to step S50 to select an auto-focus point with priority being given to an object having high contrast. If the user is dissatisfied with this scheme as well, he/she may operate the switch 20. At this time, the flow advances from step S51 to step S52 to select a distance measurement point with priority being given to a point nearest to a predetermined distance.

Repeating focus adjustment while switching the selection schemes in this manner allows the user to continue photographing operation upon selecting a selection scheme most suitable for his/her purpose while basically performing high-speed focus adjustment by the most general selection scheme of giving priority to an object at the nearest distance.

When the photographing operation is completed, and the next photographing operation is started, the flow skips step S31, and hence the candidate point selection scheme is stored. In the same scene, therefore, the user can enjoy photographing operation by the selection scheme that has produced a satisfactory result.

FIGS. 5A through 5E show examples of scenes in which these selection modes are effective.

Figure 5A:
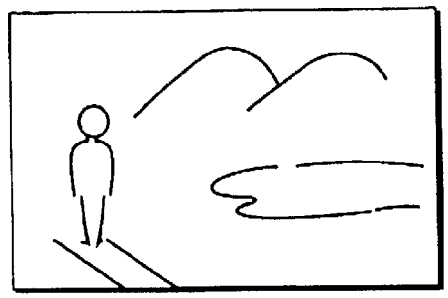
FIGS. 5A through 5E are views showing examples of scenes for which the respective selection modes effectively function in the second embodiment of the present invention.

As shown in FIG. 5A, for a general souvenir photograph with scenery, priority may be given to an object at the nearest distance from the camera. According to this scheme, restrictions on compositions are reduced by multi AF operation as compared with a camera that can be focused on only one point in the center of a frame.

Figure 5B:
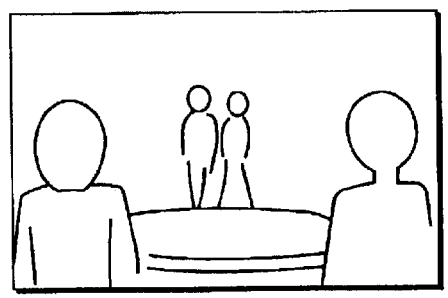

In a scene like the one shown in FIG. 5B, a person located in the center of a frame at a relatively long distance from the camera is a main object. In this case, when the nearest point is selected, the camera is undesirably focused on a person around the main object.

Figure 5C:

When a person irradiated with spot light as in FIG. 5C is to be photographed, contrast-priority point selection is preferably performed.

Figure 5D:
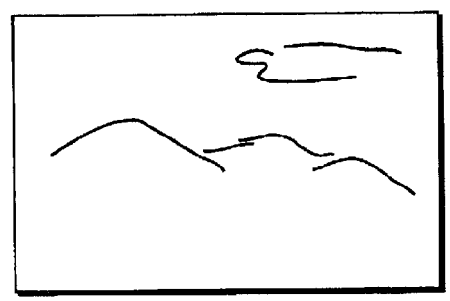

In a scenery scene with low contrast as a whole like the one shown in FIG. 5D, proper distance measurement is preferably performed at any portion having high contrast. With low contrast, erroneous distance data may be output and selected owing to a focus determination error. Using the contrast-priority point selection mode will prevent such a determination error and allow proper focus adjustment.

Figure 5E:
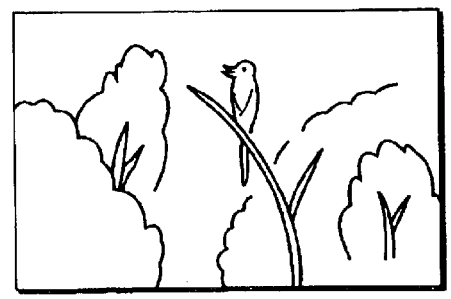

For a disorderly scene like the one shown in FIG. 5E, focus adjustment may be preferably performed with priority being given to an object at a predetermined distance.

As described above, according to the second embodiment, since a desired object to be photographed tends to exist in association with the contrast order and the position within a frame, a desired point position can be efficiently searched out with a small number of times of switching.

In addition, since the selection rule is changed, a desired point position can be efficiently searched out.

As has been described above, according to the second embodiment, when the user wants to continuously take photographs in one of the scenes described above, optimal focus point selection for the scene is performed. Therefore, a camera which allows a photographer to enjoy photographing operation with focus control as intended by him/her.

The above embodiments have exemplified the manual focus switch as a switching portion for switching in-focus points. However, the present invention is not limited to this, and the focusing rotating ring may be used. This is because the focusing rotating ring is an operation portion which is not used in the AF mode, and hence can be used as a point switching means.

In the above embodiments, the present invention is applied to the digital cameras. However, the present invention is not limited to them. For example, the present invention can be applied to a film camera, a digital movie, a cell phone with a camera, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera having an auto-focus section having distance measurement points corresponding to a plurality of paints in a frame,
the auto-focus section including a first determining section which determines a first candidate point of said plurality of points, and a second determining section which determines a second candidate point of said plurality of points which is different from the first candidate point,
the camera comprising:
a switch detecting section which detects operation of a predetermined switch by a photographer; and
a selecting section which selects/switches the first and second candidate points in accordance with a state detected by the switch detecting section.

2. A camera according to claim 1, wherein the selecting section selects the first candidate point when the switch detecting section detects no operation of the switch, and selects the second candidate point when the switch detecting section detects operation of the switch.

3. A camera according to claim 1, wherein the first and second determining sections determine candidate points in accordance with one of an order of increasing distance, an order of increasing distance with respect to a predetermined distance, an order of increasing distance to the center of a frame, and an order of decreasing contrast.

4. A camera according to claim 1, wherein the first determining section determines a distance measurement point indicating the nearest distance as the first candidate point, and the second determining section determines a point indicating the second nearest distance as the second candidate point.

5. A camera according to claim 1, which
further comprises a display section which displays positions corresponding to said plurality of candidate points in a frame, and
in which the selecting section performs point switching operation when the switch detection is performed during display operation of the display section.

6. A camera according to claim 1, wherein the predetermined switch comprises a switch which is mounted on a photographing lens and switches between an auto-focus mode and a manual focus mode.

7. A multi-point auto-focus camera having a selection/display control section which selects and displays at least one of a plurality of distance measurement points using a predetermined algorithm, comprising:
a switch which selects a manual focus mode;
a focusing rotating ring which gives an instruction for focusing in the manual focus mode; and
a point switching control section which switches the selected/displayed point in accordance with rotation operation of the focusing rotating ring when control operation is performed by the selection/display control section.

8. A camera comprising:
a rotating ring which is provided on a lens barrel portion for issuing an instruction associated with focusing operation;
an auto-focus section which performs focusing operation on the basis of an in-focus point position in a frame;
a switching section which switches the in-focus point position in the frame; and
a control section which performs control to set the instruction from the rotating ring as a switching instruction to the switching section or an instruction for focusing in a manual focus mode.

9. A camera according to claim 8, wherein the switching section switches the in-focus point position in accordance with a predetermined rule.

10. A camera comprising:
an operating section which issues an instruction associated with focusing operation;

an auto-focus section which performs focusing operation on the basis of an in-focus point position in a frame;

a switching section which switches the in-focus point position in the frame; and a control section which performs control to set an instruction from the operating section as a switching instruction to the switching section or a specific operation instruction associated with focusing operation other than the switching operation, wherein the switching section switches the in-focus point position in accordance with a predetermined rule, and wherein the predetermined rule comprises a rule which switches the in-focus point in order of increasing object distance on the basis of an object distance at each in-focus point position.

11. A camera comprising:

an operating section which issues an instruction associated with focusing operation;

an auto-focus section which performs focusing operation on the basis of an in-focus point position in a frame;

a switching section which switches the in-focus point position in the frame; and a control section which performs control to set an instruction from the operating section as a switching instruction to the switching section or a specific operation instruction associated with focusing operation other than the switching operation, wherein the switching section switches the in-focus point position in accordance with a predetermined rule, and wherein the predetermined rule comprises a rule which switches the in-focus point in order of decreasing contrast on the basis of an object distance at each in-focus point position.

12. A camera according to claim 9, wherein the predetermined rule comprises a rule which switches the in-focus point in predetermined switching order of the in-focus point position.

13. A camera comprising:

an operating section which issues an instruction associated with focusing operation;

an auto-focus section which performs focusing operation on the basis of an in-focus point position in a frame;

a switching section which switches the in-focus point position in the frame; and a control section which performs control to set an instruction from the operating section as a switching instruction to the switching section or a specific operation instruction associated with focusing operation other than the switching operation, wherein the switching section switches the in-focus point position in accordance with a predetermined rule, and wherein the predetermined rule comprises a rule which sequentially changes a condition for selecting one of a plurality of in-focus point positions, and switches one in-focus point position selected under the changed selection condition.

14. A camera according to claim 13, wherein at least two conditions of a condition for selection of an in-focus point position in accordance with an object distance at each in-focus point position, a condition for selection of an in-focus point position in accordance with contrast of an object at each in-focus point position, and a condition for selection of an in-focus point position in accordance with a predetermined switching order of the in-focus point position are prepared as the conditions.

15. A camera according to claim 13, wherein the auto-focus section uses one of the conditions which is used for immediately preceding photographing operation as a condition used first by the operating section in issuing an operation instruction.

16. A camera according to claim 14, wherein the auto-focus section uses one of the conditions which is used for immediately preceding photographing operation as a condition used first by the operating section in issuing an operation instruction.

17. A camera according to claim 11, wherein the specific operation instruction comprises an instruction to switch between the manual focus mode and the auto-focus mode.

18. A camera according to claim 15, wherein the specific operation instruction comprises an instruction to switch between the manual focus mode and the auto-focus mode.

19. A camera according to claim 8, wherein the instruction for focusing in a manual mode comprises an instruction to move a focusing lens.

20. A camera according to claim 11, wherein the specific operation instruction comprises an instruction to move a focusing lens.

21. A camera according to claim 12, wherein the instruction for focusing in a manual mode comprises an instruction to move a focusing lens.

22. A camera according to claim 15, wherein the specific operation instruction comprises an instruction to move a focusing lens.

23. A camera comprising:

an operating section which issues an instruction associated with focusing operation;

an auto-focus section which performs focusing operation on the basis of an in-focus point position in a frame;

a switching section which switches the in-focus point position in the frame; and a control section which performs control to set an instruction from the operating section as a switching instruction to the switching section or a specific operation instruction associated with focusing operation other than the switching operation, wherein after operation of the auto-focus section is started, the control section sets an instruction for the operating section as a switching instruction to the switching section.

24. A camera according to claim 11, wherein after operation of the auto-focus section is started, the control section sets an instruction for the operating section as a switching instruction to the switching section.

25. A camera comprising:

an operating section which issues an instruction associated with focusing operation;

an auto-focus section which performs focusing operation on the basis of an in-focus point position in a frame;

a switching section which switches the in-focus point position in the frame; and a control section which performs control to set an instruction from the operating section as a switching instruction to the switching section or a specific operation instruction associated with focusing operation other than the switching operation, wherein the switching section switches the in-focus point position in accordance with a predetermined rule, wherein the predetermined rule comprises a rule which switches the in-focus point in predetermined switching order of the in-focus point position, and wherein after operation of the auto-focus section is started, the control section sets an instruction for the operating section as a switching instruction to the switching section.

26. A camera according to claim 15, wherein after operation of the auto-focus section is started, the control section sets an instruction for the operating section as a switching instruction to the switching section.

27. A control method for a focusing device which can switch in-focus point positions for auto-focus operation within a frame, wherein an operation instruction by a specific operation section which issues an instruction associated with focusing operation is controlled as an instruction to switch the in-focus position within a predetermined period after start of auto-focus operation, and as a specific instruction associated with another focusing operation other than the in-focus point position switching during a period other than the predetermined period.

* * * * *